United States Patent
Aniano et al.

(10) Patent No.: US 9,577,835 B2
(45) Date of Patent: Feb. 21, 2017

(54) ONLINE CHATS WITHOUT DISPLAYING CONFIDENTIAL INFORMATION

(71) Applicant: salesforce.com, inc., San Francisco, CA (US)

(72) Inventors: Jonathan Aniano, San Francisco, CA (US); Andrew Lintner, Royal Oak, MI (US); Rachel Wang, San Mateo, CA (US); Arunesh Banerjee, Fremont, CA (US); Tim Christian Schmidt, San Mateo, CA (US); Ryan L. Smith, San Mateo, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 14/330,193

(22) Filed: Jul. 14, 2014

(65) Prior Publication Data

US 2015/0227759 A1    Aug. 13, 2015

Related U.S. Application Data

(60) Provisional application No. 61/936,977, filed on Feb. 7, 2014, provisional application No. 61/936,983, filed on Feb. 7, 2014.

(51) Int. Cl.
*H04L 29/00* (2006.01)
*H04L 12/18* (2006.01)
*G06F 21/62* (2013.01)

(52) U.S. Cl.
CPC ....... *H04L 12/1813* (2013.01); *G06F 21/6245* (2013.01); *H04L 12/1822* (2013.01)

(58) Field of Classification Search
CPC .. G06F 3/0484; G06F 9/44526; G06F 9/4443; G06F 8/60; G06F 21/6245; H04M 3/5166; H04M 3/523; H04M 3/58; H04M 3/5191; H04M 2203/4536; H04L 12/1822; H04L 12/1813
USPC ......................................................... 726/28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Magento, "Is it possible to create an iframe-based payment method in Magento?," Internet Article at: http://magento.stackexchange.com/questions/7334/is-it-possible-to-create-an-iframe-based-payment-method-in-magento. Aug. 29, 2013. 4 pages.*

(Continued)

*Primary Examiner* — Don Zhao
(74) *Attorney, Agent, or Firm* — Dergosits & Noah LLP; Todd A. Noah

(57) ABSTRACT

Systems and methods are provided for online chats without displaying confidential information. A system sends, from a first online chat participant, an information request to a second online chat participant. The system receives, from the second online chat participant, a response based on the information request. The system notifies the first online chat participant of receiving the response from the second online chat participant without displaying confidential information of the response to the first online chat participant.

20 Claims, 4 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,406,501 B2 | 7/2008 | Szeto et al. |
| 7,412,455 B2 | 8/2008 | Dillon |
| 7,454,509 B2 | 11/2008 | Boulter et al. |
| 7,502,831 B1 * | 3/2009 | Macias et al. ............... 709/206 |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0136190 A1 * | 6/2007 | Engle ............... G06Q 20/102 705/40 |
| 2007/0245249 A1 * | 10/2007 | Weisberg ............ G06F 9/4443 715/758 |
| 2008/0249972 A1 | 10/2008 | Dillon |
| 2009/0100342 A1 | 4/2009 | Jakobson |
| 2009/0328173 A1 * | 12/2009 | Jakobson et al. ............. 726/7 |
| 2010/0076760 A1 * | 3/2010 | Kraenzel et al. ............. 704/235 |
| 2011/0051918 A1 * | 3/2011 | Fan .................. H04M 3/5166 379/211.02 |

(56) References Cited

U.S. PATENT DOCUMENTS

| | | | |
|---|---|---|---|
| 2011/0185287 A1* | 7/2011 | Dharmarajan | G06F 17/30902 715/752 |
| 2012/0233137 A1 | 9/2012 | Jakobson et al. | |
| 2013/0205408 A1* | 8/2013 | Yerli | 726/28 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0238714 A1* | 9/2013 | Barak et al. | 709/206 |
| 2014/0052633 A1* | 2/2014 | Gandhi | G06Q 40/02 705/44 |
| 2014/0114790 A1* | 4/2014 | Ayodele | 705/26.3 |
| 2014/0126708 A1* | 5/2014 | Sayko | H04M 11/00 379/93.01 |
| 2014/0126715 A1* | 5/2014 | Lum | H04M 3/5133 379/265.09 |

OTHER PUBLICATIONS

Saba, "Saba Announces Revolutionary Social Enterprise Platform," Press Release, Mar. 20, 2012, pp. 1-4, Redwood Shores, California.
U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

ONLINE CHATS WITHOUT DISPLAYING CONFIDENTIAL INFORMATION

CLAIM OF PRIORITY

This application claims the benefit of U.S. Provisional Patent Application No. 61/936,977 entitled SYSTEM AND METHOD FOR ONLINE CHATS WITHOUT DISPLAYING SECURE CONTENT, by Aniano, et al., filed Feb. 7, 2014 and U.S. Provisional Patent Application No. 61/936,983 entitled SYSTEM AND METHOD FOR ROUTING ONLINE CHATS, by Aniano, et al., filed Feb. 7, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Online chat refers to any kind of communication over a communication network that offers a real-time transmission of text messages from sender to receiver. Online chat messages are generally short, which enables other participants to respond quickly, thereby creating a feeling similar to a spoken conversation, which distinguishes online chatting from other text-based online communication forms such as Internet forums and email. Online chat may include point-to-point communications as well as multicast communications from one sender to many receivers. Online chat includes web-based applications that enable communication which is often directly addressed, but may be anonymous between users in a multi-user environment. Sometimes communicating confidential information during online chat is desirable. For example, a customer service representative may be using an online chat session to assist a banking customer and may need the banking customer to enter the banking customer's personal identification number, or P.I.N., to continue providing assistance. However, the banking customer does not want to disclose the confidential P.I.N. to the customer service representative. Accordingly, it is desirable to provide techniques that enable online chats without displaying confidential information.

BRIEF SUMMARY

In accordance with embodiments, there are provided systems and methods for online chats without displaying confidential information. An information request is sent from a first online chat participant to a second online chat participant. A response based on the information request is received from the second online chat participant. The first online chat participant is notified of receiving the response from the second online chat participant without displaying confidential information of the response to the first online chat participant. For example, during an online chat session, a customer service representative becomes the first online chat participant described above and sends a confidential information form as the information request to a banking customer for entering the banking customer's personal identification number, or P.I.N., to continue providing assistance. A back end server receives the confidential information form that includes the banking customer's P.I.N. The back end server provides the banking customer's account information, based on the banking customer's P.I.N., to the customer service representative so that the customer service representative can continue providing assistance to the banking customer, but without displaying the banking customer's P.I.N to the customer service representative. Accordingly, systems and methods are provided which enable a database system to provide online chats without displaying confidential information.

While one or more implementations and techniques are described with reference to an embodiment in which online chats without displaying confidential information is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for online chats without displaying confidential information. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for online chats without displaying confidential information will be described with reference to example embodiments. The following detailed description will first describe a method for online chats without displaying confidential information. Next, a block diagram of an example system that implements online chats without displaying confidential information is described.

Figure 1:
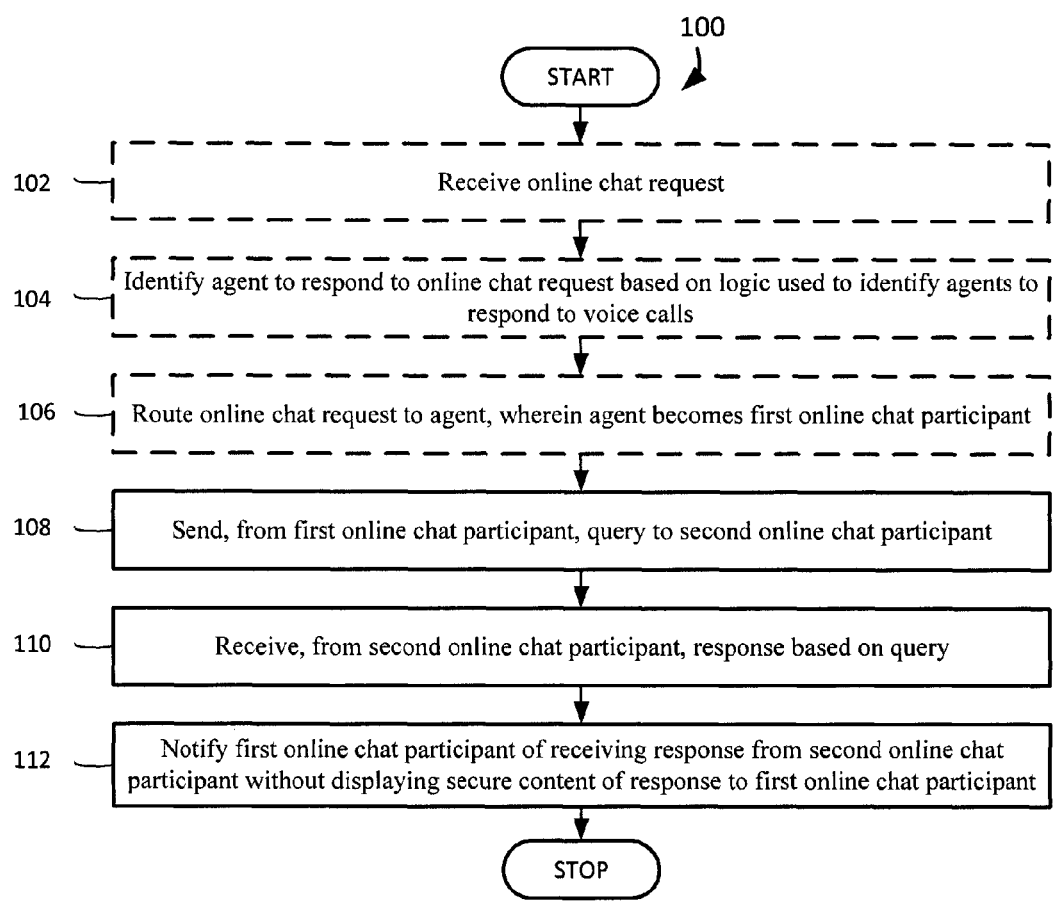
FIG. 1 is an operational flow diagram illustrating a high level overview of a method for online chats without displaying confidential information in an embodiment.

FIG. 1 is an operational flow diagram illustrating a high level overview of a method 100 for online chats without displaying confidential information. As shown in FIG. 1, a database system can provide online chats without displaying confidential information.

An online chat request is optionally received, block 102. For example and without limitation, this can include the database system receiving an online chat request from a banking customer who prefers to use online chat to request assistance from customer service representatives. After receiving the online chat request, an agent is optionally identified to respond to the online chat request based on logic used to identify agents to respond to voice calls, block 104. By way of example and without limitation, this can include the database system identifying a customer service representative to respond to the banking customer's online chat request based on a call center's software that identifies which of the call center's agents will answer incoming telephone calls by evaluating skill levels and other qualifications of the agents, such as the agents' workloads, whether they are on an existing phone call, etc.

Having identified an agent, the online chat request is routed to the agent, block 106. In embodiments, this can include the database system routing the banking customer's online chat request to the identified agent. The database system may integrate with the voice routing logic on the customer side and/or the agent side to route chat requests and to collect data on customers, agents, and online chats by intercepting and interacting with all chat related events. This integration enables the database system to fully utilize third-party voice routing logic provided by telephony vendors, including the compilation of full statistical reports. After routing the online chat request to the agent, who may be referred to as the first online chat participant, the agent sends an information request to a second online chat participant, block 108. For example and without limitation, during an online chat session, a customer service representative selects a confidential information form from many different confidential information forms available in an inline frame in the agent chat window and sends the confidential information form to the banking customer for entering the banking customer's personal identification number, or P.I.N., to enable the agent to continue providing assistance. Alternatively, the customer service representative selects a link from many different available links in an inline frame in the agent chat window to send a confidential information form of many different confidential information forms available to the banking customer.

Although this example describes an agent selecting a confidential information form from many different confidential information forms available in an inline frame in the agent chat window and sending the confidential information form to a customer, the agent may simply send an information request the customer via the chat window and the customer may select a confidential information form from many different confidential information forms available in an inline frame in the customer chat window and use the confidential information form to respond to the information request. Alternatively, the agent and/or the customer may use their own HTML form via an HTTP post call instead of using an inline frame in a chat window. Either the agent or the customer may select and use a confidential information form via the use of application programming interfaces on the agent's workstation or the customer's client device, such as JavaScript API's. Even if a customer may want to disclose confidential information to a customer service representative, the customer service representative may select and send a confidential information form to the customer because of regulatory requirements for processing confidential information, such as the Health Insurance Portability and Accountability Act of 1996 (HIPAA).

Having sent the information request to the second online chat participant, a response based on the information request is received from the second online chat participant, block 110. By way of example and without limitation, this can include a back end server receiving the confidential information form that includes the banking customer's P.I.N. After receiving the response, the first online chat participant is notified of receiving the response from the second online chat participant without displaying confidential information of the response to the first online chat participant, block 112. In embodiments, this can include the back end server providing the banking customer's account information, based on the banking customer's P.I.N., to the customer service representative so that the customer service representative can continue providing assistance to the banking customer, but without displaying the banking customer's P.I.N to the customer service representative. Accordingly, systems and methods are provided which enable a database system to provide online chats without displaying confidential information.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

Figure 2:
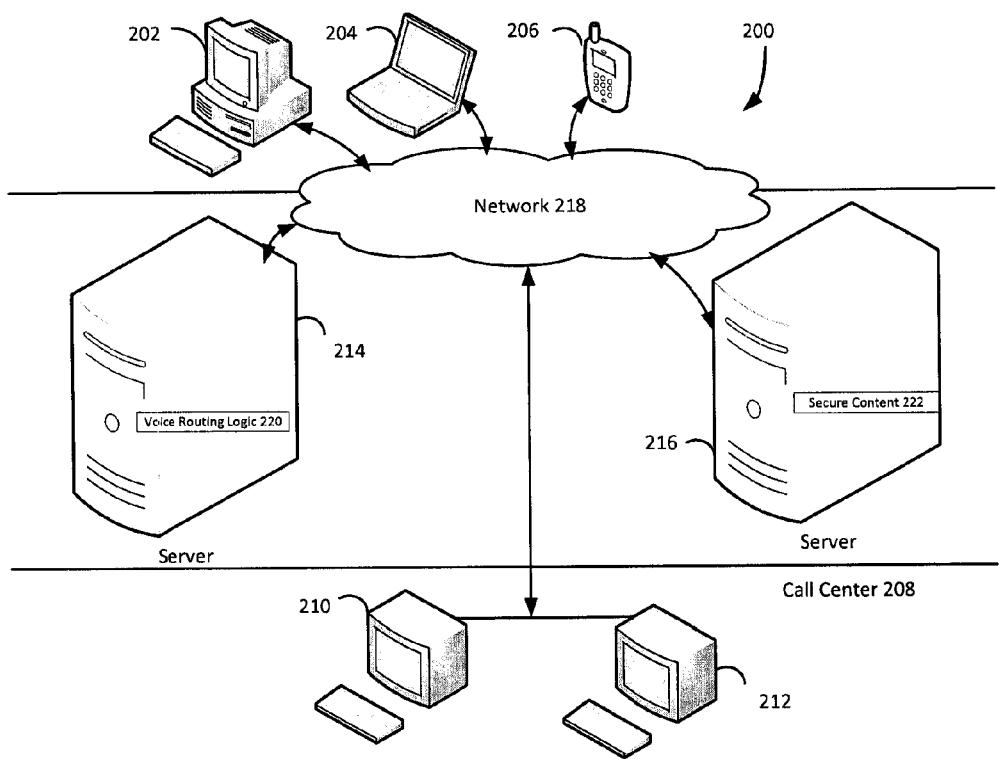
FIG. 2 is a block diagram of a system that implements online chats without displaying confidential information in an embodiment.

FIG. 2 illustrates a block diagram of an example system that implements online chats without displaying confidential information, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, a third client 206, a call center 208 which includes a first workstation 210 and a second workstation 212, and a first server 214 and a second server 216 that may be provided by a hosting company. Although the clients 202-206 may be any type of client devices, such as wearable devices, the clients 202-206 may be referred to as the desktop computer 202, the laptop computer 204, and the mobile phone 206, while the servers 214-216 may be referred to as the routing server 214 and the confidential information server 216. Even though the separation of functions may be preferable from a security perspective, in some embodiments the routing server 214 and the confidential information server 216 may be implemented in a single server. The routing server 214 includes voice routing logic 220 and the confidential information server 216 includes confidential information 222. The clients 202-206, the call center 208, and the servers 214-216 communicate via a network 218. Although FIG. 2 depicts the system 200 with three clients 202-206, one call center 208, two workstations 210-212, two servers 214-216, and one network 218, the system 200 may include any number of clients 202-206, any number of call centers 208, any number of workstations 210-212, any number of servers 214-216, and any number of networks 218. The clients 202-206 and the workstations 210-212 may each be substantially similar to the user systems 312 described below in reference to FIG. 3.

In another example, a customer visiting a store that sells luxury coats uses an in-store device made available by the store for customers to visit a website that sells luxury coats and to request an online chat with a customer service representative. The routing server 214 uses the voice routing logic 220 to identify the agent using the workstation 210 as the best customer service representative who is currently available for such an online chat. During the online chat, the customer service representative identifies the location of the in-store device at a store that sells the luxury coats, and sends additional photos of the luxury coats which are unavailable in the store via the agent chat window to the customer, who indicates, via the online chat, a desire to purchase one of the coats depicted in the photos. The customer service representative clicks on a button displayed in the agent chat window by the workstation 210, which causes a confidential information form to pop up in the customer's chat window. The customer enters their credit card number in the confidential information form, which the laptop computer 204 sends to the confidential information server 216, which stores the credit card number in the confidential information 222 without displaying the credit card number on the workstation 210 of the customer service representative. The confidential information server 216 notifies the customer service representative that the sale has been approved based on the customer's credit card number, the customer service representative informs the customer about the approval via an online chat message, and the customer service representative begins processing the order.

System Overview

Figure 3:
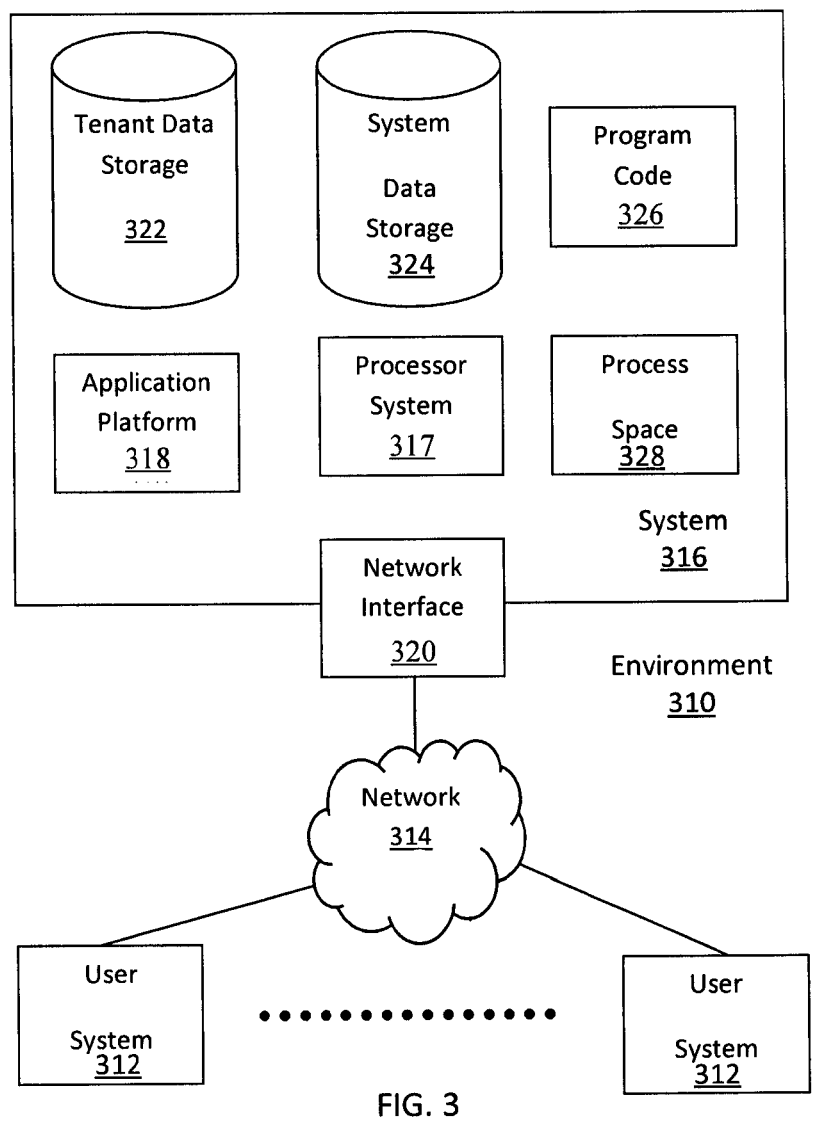
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 can be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device can be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
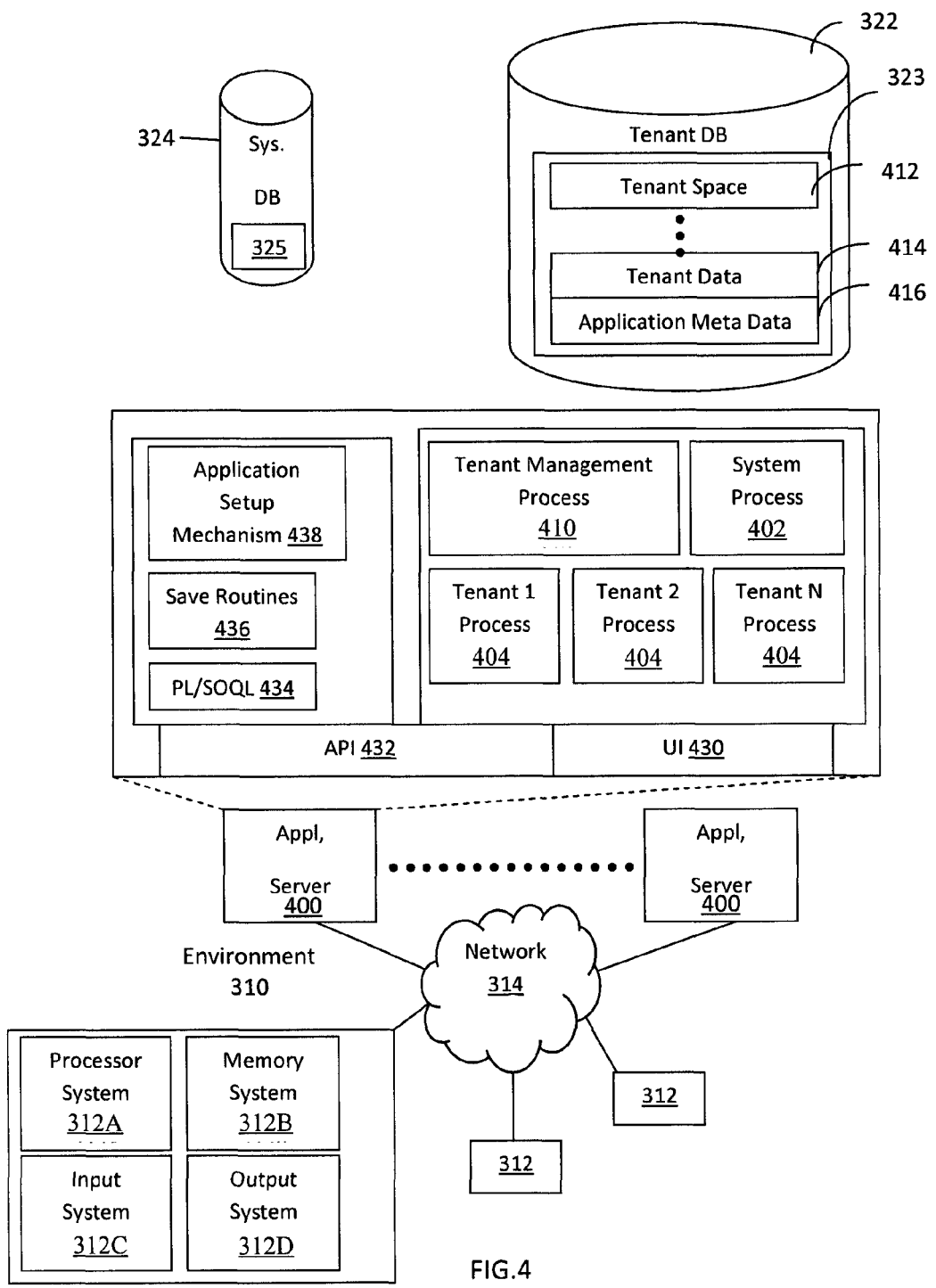
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 400$_1$-400$_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 34 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for online chats without displaying confidential information, the apparatus comprising:
one or more processors; and
a non-transitory computer readable medium storing a plurality of instructions, which when executed, cause the one or more processors to:
receive, by a confidential information server, a selection of one of a plurality of confidential forms provided for display within a first inline frame in a first chat window associated with a first online chat participant;
receive, by the confidential information server from second online chat participant, a response based on an information request sent from the first online chat participant to the second online chat participant, the information request corresponding to the selected confidential form and being sent by the first online chat participant to the second online participant to be displayed within a second inline frame in a second chat window associated with the second online chat participant, the response including confidential information provided by the second online chat participant within the second inline frame in the second chat window associated with the second online chat participant;
retrieve, by the confidential information server, data associated with the second online chat participant based on the confidential information; and
send, by the confidential information server to the first online chat participant, a notification that the response from the second online chat participant has been received without displaying the confidential information of the response to the first online chat participant, the notification including the data associated with the second online chat participant.

2. The apparatus of claim 1, wherein the plurality of confidential forms is represented by a plurality of information request objects from which the first online chat participant has the option of selecting.

3. The apparatus of claim 1, wherein the information request corresponding to the selected confidential form to be displayed within a second inline frame in a second chat window associated with the second online chat participant is a request for a personal identification number (PIN), and wherein the response received from the second online chat participant comprises an entry of a PIN by the second online chat participant.

4. The apparatus of claim 1, wherein at least one of the information request object and the response is initiated in an inline frame in a chat window.

5. The apparatus of claim 1, further comprising the steps of:
receiving an online chat request;
identifying an agent to respond to the online chat request based on logic used to identify agents to respond to voice calls; and
routing the online chat request to the agent, wherein the agent becomes the first online chat participant.

6. A computer program product comprising computer-readable program code to be executed by one or more processors when retrieved from a non-transitory computer-readable medium, the program code including instructions to:
receive, by a confidential information server, a selection of one of a plurality of confidential forms provided for display within a first inline frame in a first chat window associated with a first online chat participant;
receive, by the confidential information server from a second online chat participant, a response based on an information request sent from the first online chat participant to the second online chat participant, the information request corresponding to the selected confidential form and being sent by the first online chat participant to the second online participant to be displayed within a second inline frame in a second chat window associated with the second online chat participant, the response including confidential information provided by the second online chat participant within the second inline frame in the second chat window associated with the second online chat participant;
retrieve, by the confidential information server, data associated with the second online chat participant based on the confidential information; and
send, by the confidential information server to the first online chat participant, a notification that the response from the second online chat participant has been received without displaying the confidential information of the response to the first online chat participant, the notification including the data associated with the second online chat participant.

7. The computer program product of claim 6, wherein the plurality of confidential forms is represented by a plurality of information request objects from which the first online chat participant has the option of selecting.

8. The computer program product of claim 6, wherein the information request corresponding to the selected confidential form to be displayed within a second inline frame in a second chat window associated with the second online chat participant is a request for a personal identification number (PIN), and wherein the response received from the second online chat participant comprises an entry of a PIN by the second online chat participant.

9. The computer program product of claim 6, wherein at least one of the information request object and the response is initiated in an inline frame in a chat window.

10. The computer program product of claim 6, the program code further including instructions to:
receive an online chat request;
identify an agent to respond to the online chat request based on logic used to identify agents to respond to voice calls; and
route the online chat request to the agent, wherein the agent becomes the first online chat participant.

11. A method for online chats without displaying confidential information, the method comprising:
receiving, by a confidential information server, a selection of one of a plurality of confidential forms provided for display within a first inline frame in a first chat window associated with a first online chat participant;
receiving, by the confidential information server from a second online chat participant, a response based on an information request sent from the first online chat participant to the second online chat participant, the information request corresponding to the selected confidential form and being sent by the first online chat participant to the second online participant to be displayed within a second inline frame in a second chat window associated with the second online chat participant, the response including confidential information provided by the second online chat participant within the second inline frame in the second chat window associated with the second online chat participant;
retrieving, by the confidential information server, data associated with the second online chat participant based on the confidential information; and
sending, by the confidential information server to the first online chat participant, a notification that the response from the second online chat participant has been received without displaying the confidential information of the response to the first online chat participant, the notification including the data associated with the second online chat participant.

12. The method of claim 11, wherein the plurality of confidential forms is represented by a plurality of information request objects from which the first online chat participant has the option of selecting.

13. The method of claim 11, wherein the information request corresponding to the selected confidential form to be displayed within a second inline frame in a second chat window associated with the second online chat participant is a request for a personal identification number (PIN), and wherein the response received from the second online chat participant comprises an entry of a PIN by the second online chat participant.

14. The method of claim 11, wherein at least one of the information request object and the response is initiated in an inline frame in a chat window.

15. The method of claim 11, the method further comprising:
receiving an online chat request;
identifying an agent to respond to the online chat request based on logic used to identify agents to respond to voice calls; and
routing the online chat request to the agent, wherein the agent becomes the first online chat participant.

16. A method for transmitting code for online chats without displaying confidential information, the method comprising:

transmitting code to receive, by a confidential information server, a selection of one of a plurality of confidential forms provided for display within a first inline frame in a first chat window associated with a first online chat participant;

transmitting code to receive, by the confidential information server from a second online chat participant, a response based on an information request sent from the first online chat participant to the second online chat participant, the information request corresponding to the selected confidential form and being sent by the first online chat participant to the second online participant to be displayed within a second inline frame in a second chat window associated with the second online chat participant, the response including confidential information provided by the second online chat participant within the second inline frame in the second chat window associated with the second online chat participant;

transmitting code to retrieve, by the confidential information server, data associated with the second online chat participant based on the confidential information; and transmitting code to send, by the confidential information server to the first online chat participant, a notification that the response from the second online chat participant has been received without displaying the confidential information of the response to the first online chat participant, the notification including the data associated with the second online chat participant.

17. The method for transmitting code of claim 16, wherein the plurality of confidential forms is represented by a plurality of information request objects from which the first online chat participant has the option of selecting.

18. The method for transmitting code of claim 16, wherein the information request corresponding to the selected confidential form to be displayed within a second inline frame in a second chat window associated with the second online chat participant is a request for a personal identification number (PIN), and wherein the response received from the second online chat participant comprises an entry of a PIN by the second online chat participant.

19. The method for transmitting code of claim 16, wherein at least one of the information request object and the response is initiated in an inline frame in a chat window.

20. The method for transmitting code of claim 16, the method further comprising:

transmitting code to receive an online chat request;

transmitting code to identify an agent to respond to the online chat request based on logic used to identify agents to respond to voice calls; and transmitting code to route the online chat request to the agent, wherein the agent becomes the first online chat participant.

\* \* \* \* \*